US009660989B1

(12) United States Patent
Fredinburg et al.

(10) Patent No.: US 9,660,989 B1
(45) Date of Patent: May 23, 2017

(54) INTERNET-WIDE IDENTITY MANAGEMENT WIDGET

(71) Applicant: GOOGLE INC., Mountain View, CA (US)

(72) Inventors: Dan Fredinburg, Mountain View, CA (US); Andrew Swerdlow, Mountain View, CA (US); Alex Brett Abelin, New York, NY (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/170,477

(22) Filed: Jan. 31, 2014

(51) Int. Cl.
H04L 29/06 (2006.01)

(52) U.S. Cl.
CPC .............................. *H04L 63/0884* (2013.01)

(58) Field of Classification Search
CPC .. H04L 63/0884; H04L 63/0815; G06F 21/41
See application file for complete search history.

(56) References Cited

U.S. PATENT DOCUMENTS

| | | | | |
|---|---|---|---|---|
| 6,763,468 B2 * | 7/2004 | Gupta | ..................... | G06F 21/33 726/10 |
| 7,293,034 B2 * | 11/2007 | Paya | ..................... | G06F 17/3089 |
| 8,136,148 B1 * | 3/2012 | Chayanam | ............... | G06F 21/31 713/183 |
| 8,161,154 B2 * | 4/2012 | Elcock | ..................... | H04L 63/08 709/225 |
| 2003/0177364 A1 * | 9/2003 | Walsh | ..................... | G06F 21/41 713/182 |
| 2007/0038934 A1 * | 2/2007 | Fellman | ............... | G06F 9/4443 715/700 |
| 2007/0130065 A1 * | 6/2007 | Staab | ..................... | G06Q 20/10 705/39 |
| 2007/0277233 A1 * | 11/2007 | Bodin | ..................... | G06F 21/10 726/9 |
| 2008/0271127 A1 | 10/2008 | Naibo et al. | | |
| 2010/0153695 A1 | 6/2010 | Bussard et al. | | |
| 2011/0020288 A1 | 1/2011 | Coffey | | |
| 2012/0159635 A1 | 6/2012 | He et al. | | |
| 2013/0097678 A1 | 4/2013 | Farsedakis | | |

(Continued)

*Primary Examiner* — Carl Colin
*Assistant Examiner* — Vance Little
(74) *Attorney, Agent, or Firm* — Procopio, Cory, Hargreaves & Savitch LLP

(57) ABSTRACT

Internet-wide identity management is described, including providing a user interface associated with a service provider; receiving, by an identity provider, a request to login a user associated with the service provider, the service provider being different from the identity provider; providing, by the identity provider to the service provider, a login status indicating that the user is authenticated, wherein, based on the login status, the user is authorized by the service provider to access a service provided by the service provider; and providing a widget associated with the login status, the widget being configured to present one or more settings associated with the user, including a first setting and a second setting, wherein the first setting is used by the service provider and the second setting is used by another service provider and not used by the service provider, and the another service provider is different from the identity provider.

19 Claims, 7 Drawing Sheets

(56) References Cited

U.S. PATENT DOCUMENTS

2013/0133056 A1\* 5/2013 Taylor .................... G06F 21/41
                                                                         726/8
2013/0247159 A1 9/2013 Hall et al.
2013/0318473 A1\* 11/2013 van Os ................ G06Q 10/00
                                                                         715/810

\* cited by examiner

INTERNET-WIDE IDENTITY MANAGEMENT WIDGET

BACKGROUND

Field

The subject matter discussed herein relates generally to data processing and, more particularly, to an internet-wide identity management widget.

Related Background

Many online services are only provided to authenticated users. Users can register with a service provider so that the users can be authenticated by the service provider. Some service providers allow users to be authenticated through a third party identity provider without the users registering with the service providers. For example, a user can register with an identity provider L, or with a service provider L that also functions as an identity provider, for other service providers. When the user wants to use services from service provider A that allows authentication through identity provider L, the user can login to L or login to A using the user's credentials with L.

When authenticated with an identity provider (e.g., L) to access A's services, a user is only provided access to the user's settings on A's website or with A's services. Similarly, when authenticated with an identity provider (e.g., L or another identity provider) to access B's services, the user is only provided access to the user's settings on B's website or with B's services. The user cannot access the user's models (e.g., privacy settings, interests, preferences, history, etc.), notifications, or account settings associated with the identity provider or another service provider. The user also cannot access other identity-oriented controls and preferences.

SUMMARY

The subject matter includes methods for implementing internet-wide identity management, including providing a user interface associated with a service provider; receiving, by an identity provider, a request to login a user associated with the service provider, the service provider being different from the identity provider; providing, by the identity provider to the service provider, a login status indicating that the user is authenticated, wherein, based on the login status, the user is authorized by the service provider to access a service provided by the service provider; and providing a widget associated with the login status, the widget being configured to present one or more settings associated with the user, including a first setting and a second setting, wherein the first setting is used by the service provider and the second setting is used by another service provider and not used by the service provider, and the another service provider is different from the identity provider The methods are implemented using one or more computing devices and/or systems. The methods may be stored in computer-readable media.

DETAILED DESCRIPTION

The subject matter described herein is taught by way of example implementations. Various details have been omitted for the sake of clarity and to avoid obscuring the subject matter. The examples shown below are directed to structures and functions for implementing internet-wide identity management widget.

Figure 1:
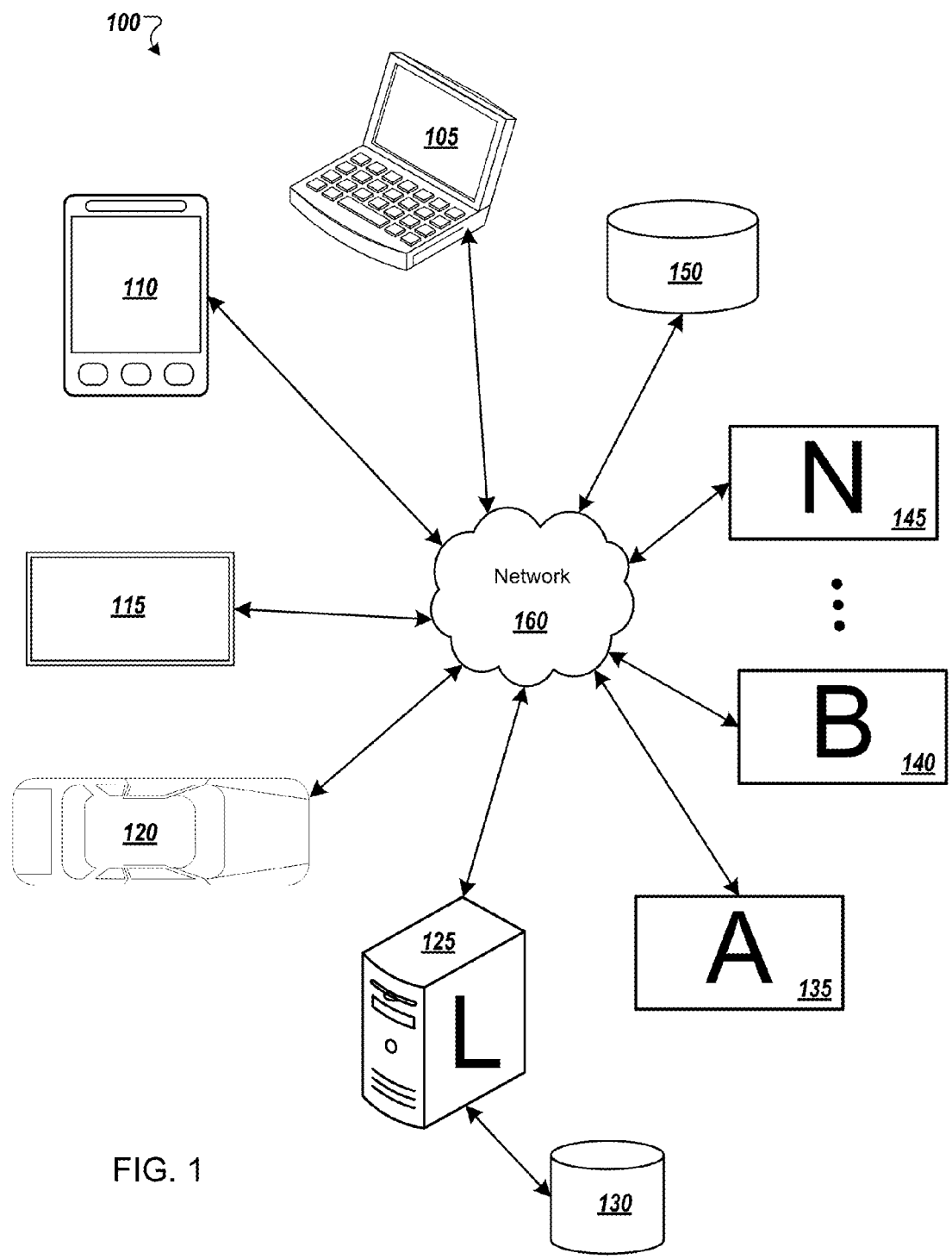
FIG. 1 shows an online environment according to some example implementations.

FIG. 1 shows an online environment according to some example implementations. Environment 100 includes devices 105-150, and each is communicatively associated with (e.g., connected to) at least one other device via, for example, network 160 (e.g., by wired and/or wireless connections). Some devices may be communicatively associated with (e.g., connected to) one or more storage devices 130 and 150. An example of one or more devices 105-150 may be computing device 605 described below in FIG. 6.

In some implementations, devices 105-120 may be considered user devices (e.g., devices used by users to access services). Devices 105-120 may include, but are not limited to, a computer 105 (e.g., a laptop computing device), a mobile device 110 (e.g., smartphone, tablet, etc.), a television 115, a device associated with a vehicle 120.

Devices 125-150 may be devices associated with service providers (e.g., used by service providers to provide services and/or store data, such as webpages, text, images, audios, audio segments, videos, video segments, and/or information thereabout). Devices 125-150 may include, but are not limited to, one or more server computers 125, computing devices 135-145, and storage devices 130 and 150.

For example, devices 135-145 may be used by service providers A, B . . . N to provide services accessed by users using devices 105-120. Service providers A, B . . . N and identity provider L may each be owned by a different business entity. In some implementations, the business owner or controller of identity provider L also owns one or more service providers A, B . . . N.

Users of services provided by one or more service providers A, B . . . N may be authenticated with an identity provider L 125. Service providers A, B . . . N may be referred to as associated service providers (i.e., service providers associated with identity provider L). A service provider can be associated with an identity provider when two conditions are met. There is an agreement between the service provider (e.g., A, B . . . or N) and the identity provider (e.g., L) to provide identity services to the service provider. There is consent or permission by a user to login using an identity provider (e.g., the user chooses to login using the user's account and credentials registered with the identity provider instead of registering an account with the service provider).

As an example, a user Dave has registered with identity provider L and uses services provided by service providers A, B, and C (not shown), all of which may be authenticated using identity provider L. Dave may sign in to A's website using Dave's account with L. After Dave signed in using Dave's account with L on A's website, Dave is considered an authenticated user to use A's services without registering with A. Further, Dave is able to view, change, add, delete, or otherwise manage Dave's settings with B, C, and/or L while using A's services (see FIG. 3 below). That is, Dave can but does not have to sign in or authenticate separately for B, C, and/or L to manage Dave's settings with B, C, and/or L.

Figure 2A:
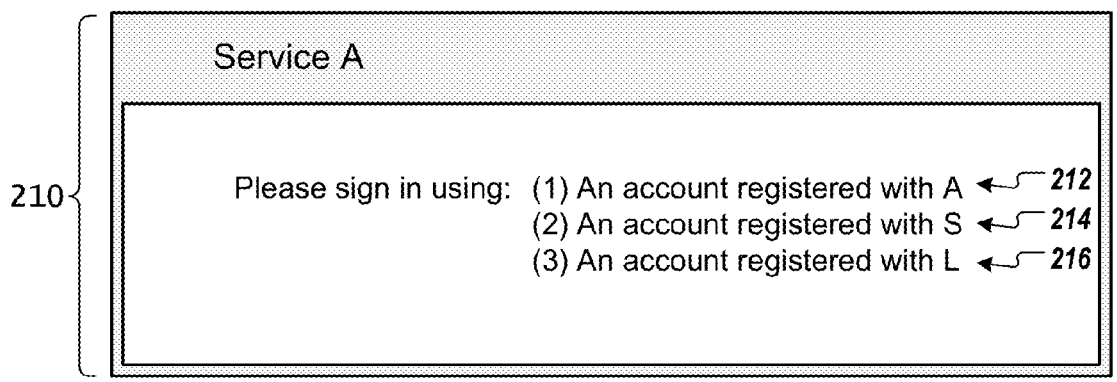
FIG. 2A shows an example user interface before a user has signed in to an online service.

FIG. 2A shows an example user interface before a user has signed in. User interface (UI) 210 may be used by a user to login to a website of service provider A (Service A). UI 210 shows, for example, three login options 212-216. Option 212 can be used by a user who has registered or will register directly with Service A. Option 214 can be used by a user who has registered or will register with service provider S, which may or may not be an identity provider. Option 216 can be used by a user who has registered or will register with service provider L, which functions as an identity provider.

In an example where a user Dave has registered or will register with service provider L (Service L), Dave can select option 216 to sign in using Dave's account or credentials with Service L to use the services provided by A.

Figure 2B:
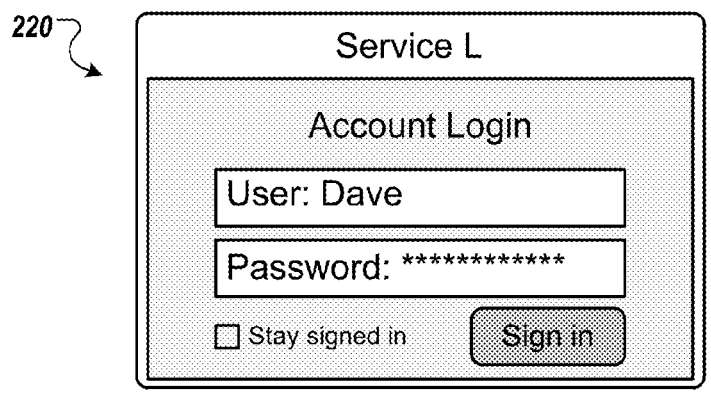
FIG. 2B shows an example login user interface.

FIG. 2B shows an example login user interface. Login window or UI 200 may be provided when option 216 (FIG. 2A) is selected. To login, Dave provides his login credentials, which may include a user name or identifier (use ID) and a password or secret code only known by Dave. There may be other options or settings (e.g., "Stay signed in" option) selectable at the time of login.

Logging in using an identity provider may be implemented in any way. For example, Dave's selecting of option 216 (or another option) may trigger a UI (e.g., login window 220) for Dave to input his login credentials. In some implementations, login window 220 encrypts Dave's credentials and sends the credentials to Service L. Service L authenticates the credentials and communicates with Service A to confirm whether the credentials have been authenticated. If authenticated, Dave may start using services provided by Service A.

In other implementations, login window 220 encrypts Dave's credentials and sends the credentials to Service L. Service A passes the encrypted credentials to Service L. Service L authenticates the credentials and communicates with Service A the status of whether the credentials have been authenticated. If authenticated, Dave may start using services provided by Service A. These are two of many possible implementations.

Figure 2C:
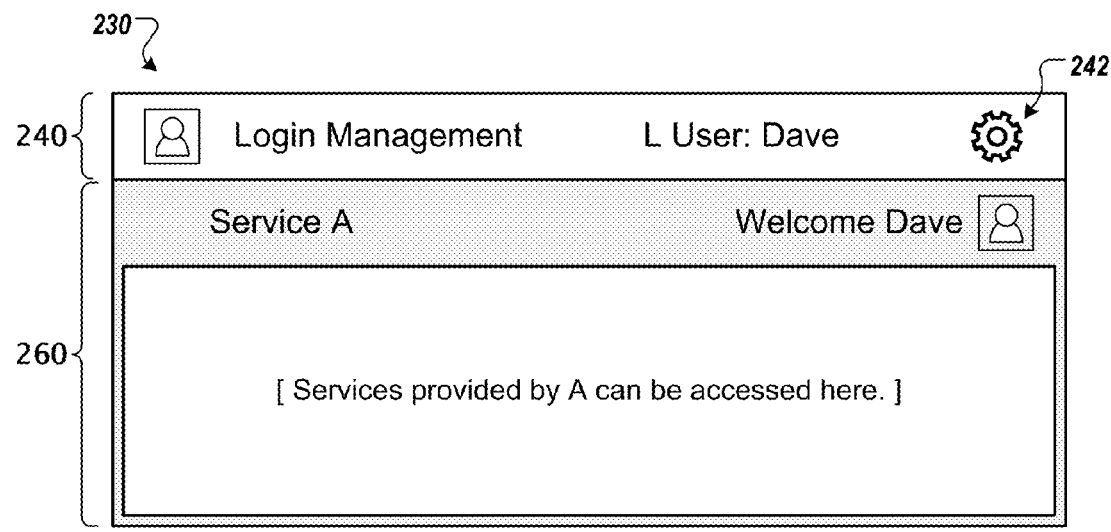
FIG. 2C shows an example user interface according to an example implementation.

FIG. 2C shows an example user interface according to an example implementation. UI 230 shows that a user Dave has logged into (e.g., authenticated for) Service A. UI 230 includes, for example, a widget 240 for login management and another widget 260 for accessing services provided by Service A.

Figure 2D:
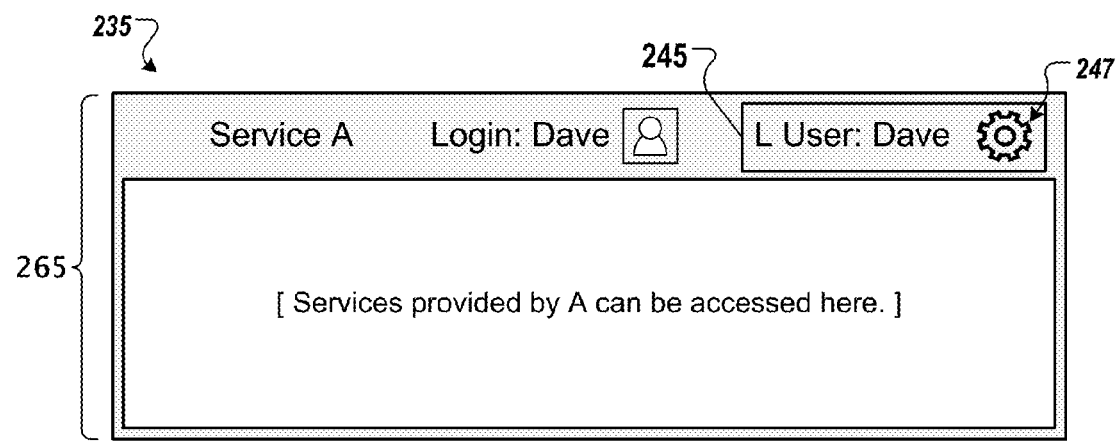
FIG. 2D shows another example user interface an according to another example implementation.

FIG. 2D shows another example user interface an according to another example implementation. UI 235 shows that a user Dave has logged into (e.g., authenticated for) Service A. UI 235 includes, for example, a widget 265 for accessing services provided by Service A. Within widget 265 is a widget 245 for login management.

UI 230 and 235 are two of many possible implementations of the subject matter describe herein. When Dave wants to view, add, change, delete, or otherwise manage Dave's settings with A, L, and/or another service providers that accept authentication using L, Dave can use widget 240 or 245, as described further with respect to FIG. 3 below.

Figure 3:
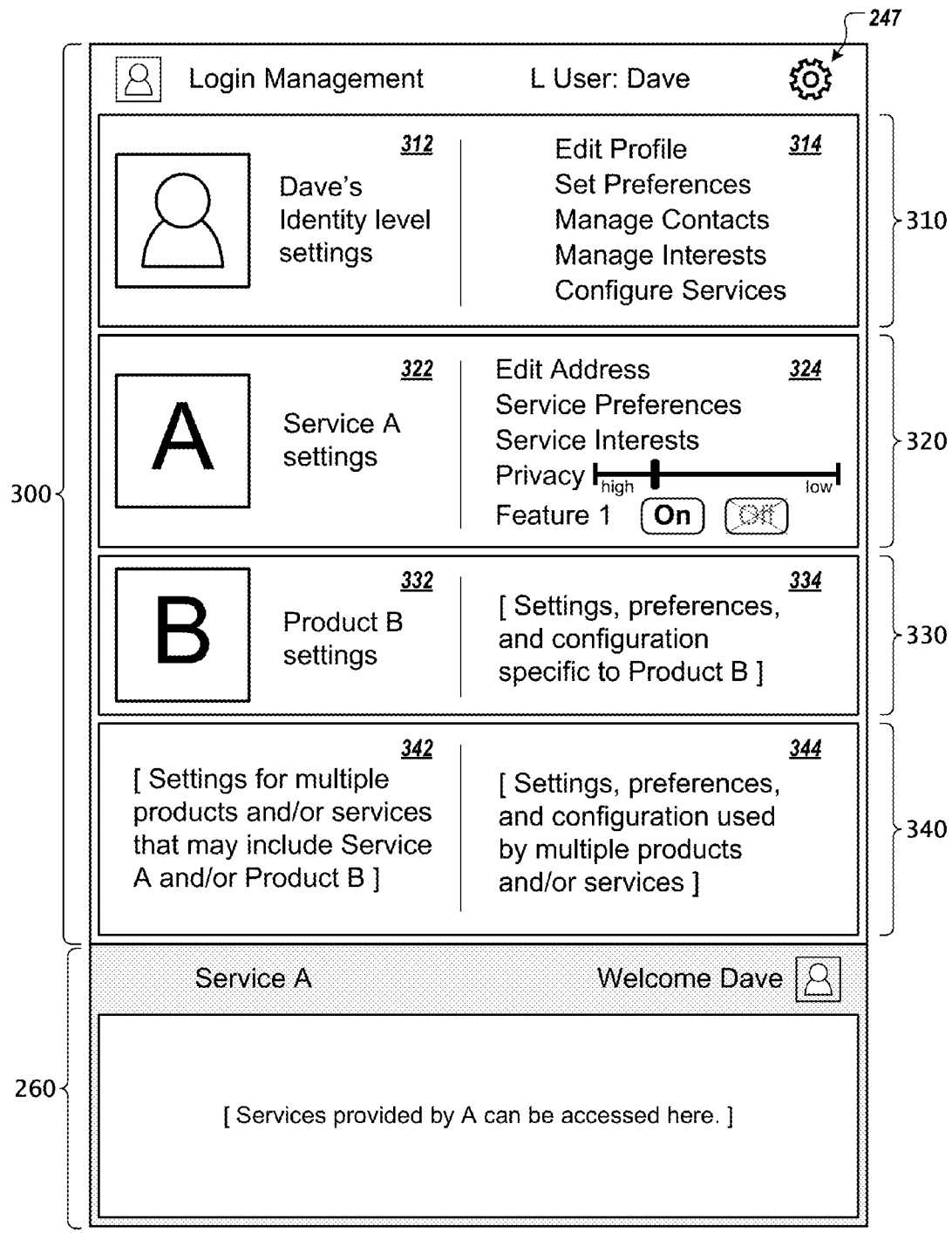
FIG. 3 shows an example identity management widget of an example implementation.

FIG. 3 shows an example identity management widget of an example implementation. UI 300 or the like is provided as an expansion of widget 240 (FIG. 2C) or widget 245 (FIG. 2D). For example, when Dave wants to view, add, change, delete, or otherwise manage Dave's settings, Dave may activate setting control 242 (FIG. 2C) or setting control 247 (FIG. 2D) to access UI 300.

UI 300 may be attached or coupled to UI 260. In some implementations, UI 300 may be separated from UI 260 (e.g., UI 300 and UI 260 may be independently shown or hidden on a display). UI 260 is provided by Service A, and UI 300 is provided in association with UI 260. In some implementations, the frame of UI 300 may also be provided by Service A. The content of UI 300 may be provided by the identity provider (e.g., Service L) that provides identity services for Service A. That is, Service L may be the backend that is associated with UI 300.

UI 300 allows a user (e.g., Dave) to manage his settings used by various service providers without logging into the service providers' websites or directly logging into the identity provider's website (e.g., Service L's website). Service providers that may be affected by or use one or more settings managed using UI 300 are the service providers that authenticate using Service L, associated with Service L, or use user settings managed by and/or stored with Service L.

UI 300 includes, for example, regions 310, 320, 330, and 340. In some implementations, different or additional regions may be included. Region 310 may be used to manage Dave's identity level settings. Regions 320 and 330 may be used to manage Dave settings specific to specific service providers (e.g., Service A and Service B, respectively). Region 340 may be used to manage Dave's settings for a group of service providers. The regions or some of the regions may have different layout (not shown) in some implementations.

Region 310 may include an identifier 312 for the region (e.g., "Dave's Identity level settings") and one or more settings 314. Settings 314 are available for use by any associated service providers. All existing settings in this region, some of which may be displayed in the region, are available for use by any service provider the user (e.g., Dave) has given consent or permission to use. Settings and their sub-settings, if any, and values may be stored with or controlled by Service L. In some implementations, one or more service providers may also store a copy (e.g., backup copy or redundant copy) of one or more settings, with the consent of the user. If a setting is deleted, it is no longer available for use. When a setting is added or changed in region 310, the setting and one or more values associated with the setting may be stored with or controlled by Service L. The setting and its associated values are available to service providers to request and use.

For example, five settings 314 are shown in region 310. Dave may have just changed the example setting "Manage Contacts" to include the contact information of another user Eva (with Eva's consent), and Dave has previously given consent to Service B and Service J (not shown) to use the "Manage Contacts" setting in association with Dave as a user when he is authenticated for B and/or J. As soon as Dave is done changing the "Manage Contacts" setting, Eva's contact information is available for Services B and J to request and use, but only in association with Dave being the authenticated user on Services from B and J. For example, Service B may be a social network. When Dave is authenticated for Service B, Dave will have access to Eva's contact information (with Eva's consent) on social network B without having to enter Eva's contact information directly with B. Dave can change his consent with respect to any setting in any region at any time (e.g., revoking Service B's access to the "Manage Contacts" setting).

In another example, Dave may have just created the setting "Set Preferences" that includes, among others, a sub-setting "Communication Preference" with the value of "Email" and another sub-setting "Email Address" with the value of an email address. Dave has set (e.g., given consent) to allow Services A, K (not shown), and M (not shown) to use the sub-setting when Dave is the authenticated user on those services. After Dave has added the "Set Preferences" setting, that setting, its sub-settings, and all associated values are available for Services A, K and M to request and use when Dave is the authenticated user.

For example, Service K may be associated with an auto repair shop. The next time Dave signs in to Service K (using Dave's account with L). Dave requests a report of the maintenance records for his vehicle. Service K requests applicable settings of Dave from Service L, and, based on the sub-settings "Communication Preference" and "Email Address," the maintenance records are provided (e.g., emailed) to Dave by Service K.

Regions 320 and 330 each may include an identifier 322 or 332, respectively, to identify the specific service providers (e.g., A and B, respectively) settings in these regions are intended for. Settings 324 are for use by Service A, and settings 334 are for use by Service B. All existing settings, some of which may be displayed in the region (e.g., 320 or 330), are available for use by the associated service provider. As described above, after a setting has been added or changed, it is available for use by the associated service provider. If a setting is deleted, it is no longer available for use.

For example, even though Dave is not currently logged in to user services of service provider B, Dave can still view, add, change, delete, or otherwise manage Dave's settings associated with Service B when Dave is logged in to Service A (according to UI 260). If as soon as Dave has finished changing or adding in region 330, the change or addition is available for Service B to use the next time Dave logs on to Service B. If Dave performs deletion in region 330, that deletion is no longer available (i.e., Service B cannot use the deleted setting or value the next time Dave is logged on to B).

Region 340 may include an identifier 342 for the region and one or more settings 344. Identifier 342 identifies one or more service providers and/or one or more groups of service providers that can use the settings 344. User Dave may be allowed to identify which service providers are included here (e.g., can use the settings 344) or in another similar region (not shown). Dave may be allowed to define groups of service providers and include some or all the groups in region 340 or one or more other similar regions (not shown). Settings 344 may be view, add, change, delete, or otherwise manage Dave's as described above in other regions 310-330. When Dave is done viewing or managing his settings in UI 300, Dave may minimize UI 300 by, for example, clicking on control 247, which may replace UI 300 with UI 240 (FIG. 2C) or UI 245 (FIG. 2D).

Figure 4:
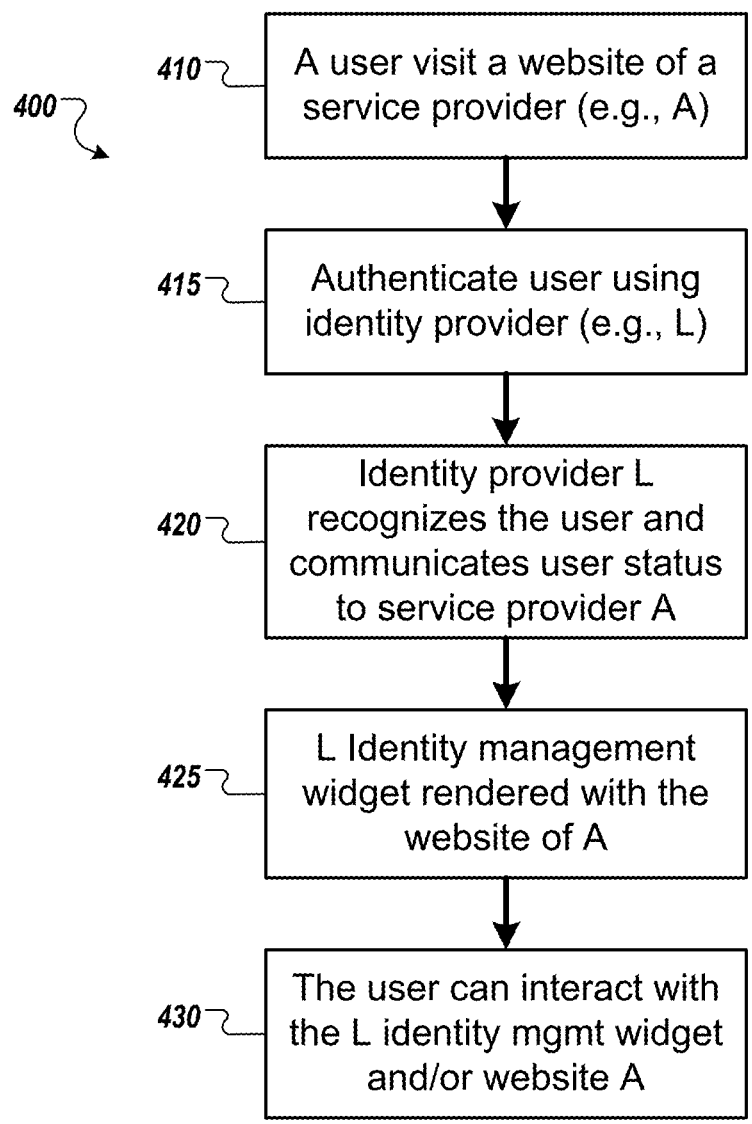
FIG. 4 shows an example of a process implementation.

FIG. 4 shows an example of a process implementation. At block 410, a user (e.g., Dave) may be visiting a website of a service provider (e.g., Service A). Dave has an account with another service provider (e.g., Service L) but has no account with Service A. Service A allows users to login using the users' accounts with Service L. Dave also has the choice to register with Service A and open an account with Service A. At block 415, Dave decides to authenticate or login to Service A using Dave's account or login credentials with L, as described with FIG. 2B above.

At block 420, Service L (e.g., a backend system of associated with Service L) authenticates Dave's account or login credentials and recognizes that Dave is a registered user with L. In some implementations, Service L may check to determine if Dave can use his account with Service A. When all is checked out (e.g., Dave is an authenticated user and/or can use Service A), Service L communicates with Service A (e.g., communicates to Service A that Dave is an authenticated user). In some implementations, Service L may communicate one or more settings applicable or pertaining to Service A (e.g., settings in regions 310, 320 and 340, FIG. 3).

At block 425, website for Service A is rendered with services provided by A. A widget or UI for identity management associated with Service L is also rendered, as shown in FIGS. 2C and 2D. At block 430, the user (e.g., Dave) can interact with the identity management UI (e.g., 240, FIG. 2C, 245, FIG. 2D, or 300, FIG. 3), the website for Service A (e.g., 260, FIG. 2C, 265, FIG. 2D, or 260, FIG. 3), or both.

In some examples, process 400 may be implemented with different, fewer, or more blocks. Process 400 may be implemented as computer executable instructions, which can be stored on a medium, loaded onto one or more processors of one or more computing devices, and executed as a computer-implemented method.

Figure 5:
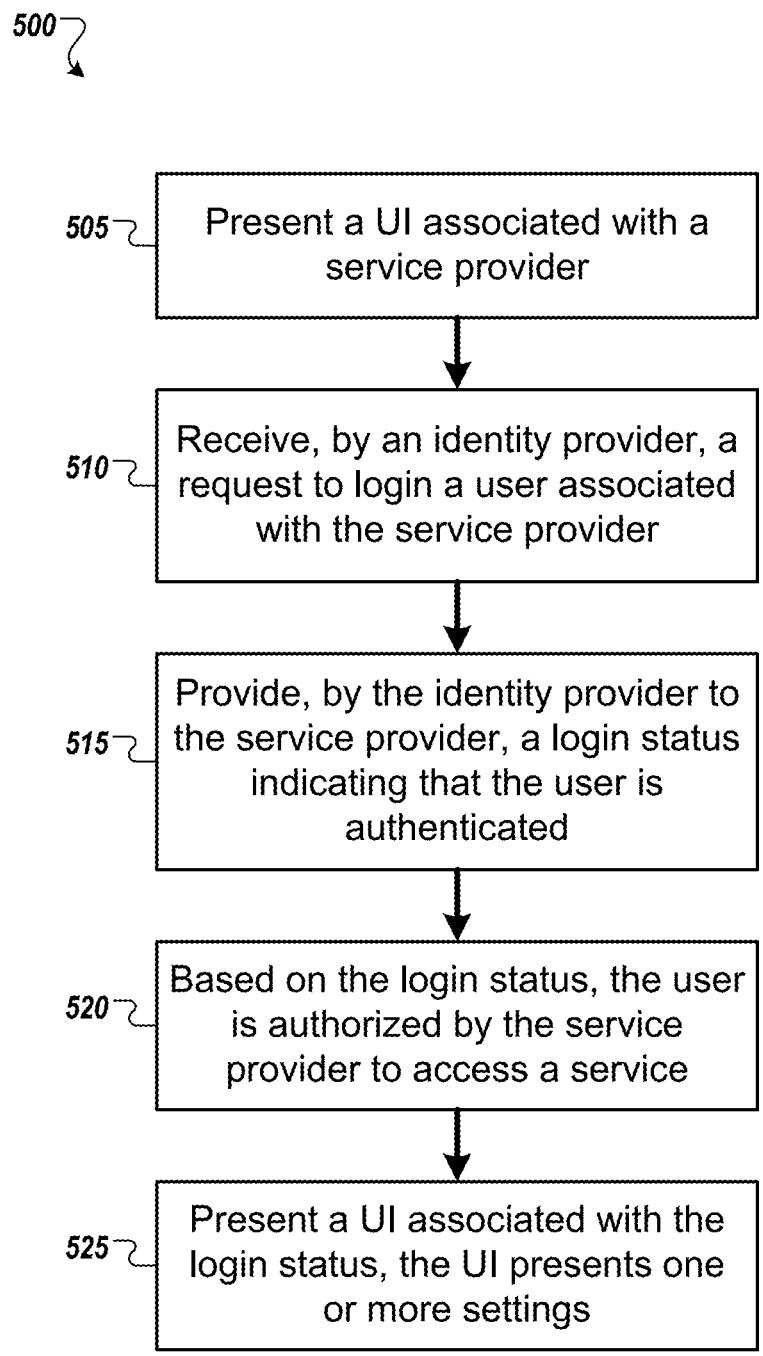
FIG. 5 shows an example of another process implementation.

FIG. 5 shows an example of another process implementation. At block 505, a user interface associated with a service provider (e.g., Service A) is presented or provided, such as UI 210, FIG. 2A. At block 510, an identity provider (e.g., Service L) receives a request to login a user (e.g., user Dave) associated with the service provider (e.g., Dave wants to login to his account with Service L). The service provider is different from the identity provider. At block 515, the identity provider authenticates Dave and provides a login status to the service provider that indicates that the user is logged into an account of Service L that is associated with the user (e.g., the user is authenticated). At block 520, based on the login status, the user is authorized by the service provider (e.g., allowed) to access one or more services provided by the service provider. At block 525, a widget associated with the login status (e.g., widget 240, FIG. 2C or 300, FIG. 3) is presented. The widget presents one or more settings associated with the user (as shown in widget 300), that includes, for example, a setting in region 320 that may be used by the service provider A and another setting in, for example, region 330, that may be used by another service provider (e.g., Service B) and not used by the service provider A.

In some examples, process 500 may be implemented with different, fewer, or more blocks. Process 500 may be implemented as computer executable instructions, which can be stored on a medium, loaded onto one or more processors of one or more computing devices, and executed as a computer-implemented method.

Figure 6:
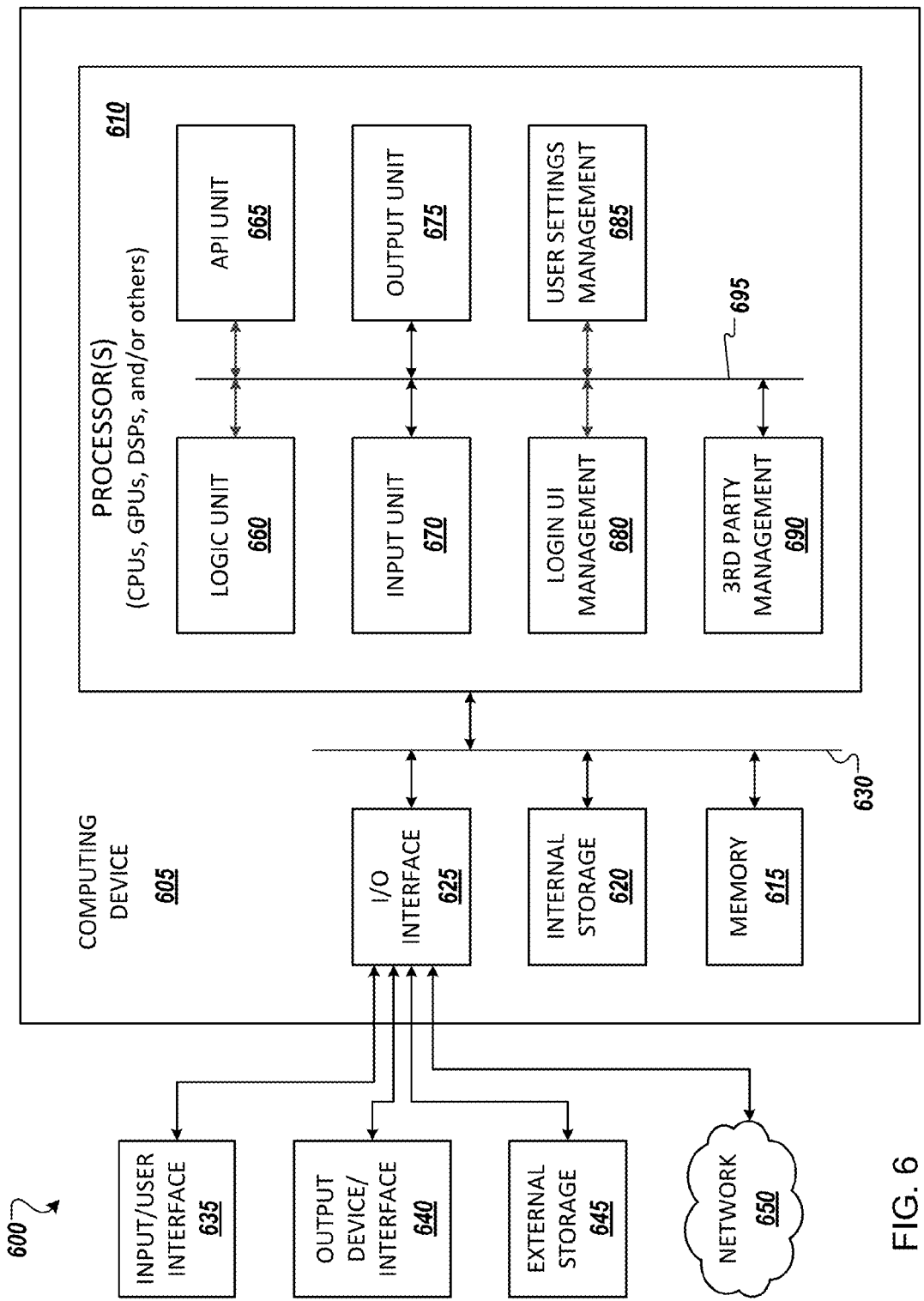
FIG. 6 shows an example computing environment with an example computing device suitable for use in some example implementations.

FIG. 6 shows an example computing environment with an example computing device suitable for use in some example implementations. Computing device 605 in computing environment 600 can include one or more processing units, cores, or processors 610, memory 615 (e.g., RAM, ROM, and/or the like), internal storage 620 (e.g., magnetic, optical, solid state storage, and/or organic), and/or I/O interface 625, any of which can be coupled on a communication mechanism or bus 630 for communicating information or embedded in the computing device 605.

Computing device 605 can be communicatively coupled to input/user interface 635 and output device/interface 640.

Either one or both of input/user interface 635 and output device/interface 640 can be a wired or wireless interface and can be detachable. Input/user interface 635 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 640 may include a display, television, monitor, printer, speaker, braille, or the like. In some example implementations, input/user interface 635 and output device/interface 640 can be embedded with or physically coupled to the computing device 605. In other example implementations, other computing devices may function as or provide the functions of input/user interface 635 and output device/interface 640 for a computing device 605.

Examples of computing device 605 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 605 can be communicatively coupled (e.g., via I/O interface 625) to external storage 645 and network 650 for communicating with any number of networked components, devices, and systems, including one or more computing devices of the same or different configuration. Computing device 605 or any connected computing device can be functioning as, providing services of, or referred to as a server, client, thin server, general machine, special-purpose machine, or another label.

I/O interface 625 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 600. Network 650 can be any network or combination of networks (e.g., the Internet, local area network, wide area network, a telephonic network, a cellular network, satellite network, and the like).

Computing device 605 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 605 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 610 can execute under any operating system (OS) (not shown), in a native or virtual environment. One or more applications can be deployed that include logic unit 660, application programming interface (API) unit 665, input unit 670, output unit 675, login UI management 680, user settings management 685, 3rd party management 690, and inter-unit communication mechanism 695 for the different units to communicate with each other, with the OS, and with other applications (not shown). For example, login UI management 680, user settings management 685, and 3rd party management 690 may implement one or more processes or UI shown and described in FIGS. 1-5. The described units and elements can be varied in design, function, configuration, or implementation and are not limited to the descriptions provided.

In some example implementations, when information or an execution instruction is received by API unit 665, it may be communicated to one or more other units (e.g., logic unit 660, input unit 670, output unit 675, login UI management 680, user settings management 685, and 3rd party management 690). For example, when login UI management 680 detects a login request from input unit 670, user authentication is performed. The user's login status is provided by, for example, output unit 675 to user settings management 685 and/or 3rd party management 690, which provides the login status and/or user settings to a third party, for which the login request is authenticated. An identity management UI or widget is populated with settings associated with the authenticated users. The user provides input to the UI to manage the settings. The input is detected by input unit 670 and pass to user settings management 685 and/or 3rd party management 690 for processing.

In some instances, logic unit 660 may be configured to control the information flow among the units and direct the services provided by API unit 665, input unit 670, output unit 675, login UI management 680, user settings management 685, and 3rd party management 690 in some example implementations described above. For example, the flow of one or more processes or implementations may be controlled by logic unit 660 alone or in conjunction with API unit 665.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A computer-implemented method, comprising:
receiving, by an identity provider, a request to login a user associated with a service provider via a user interface of the service provider, the service provider being different from the identity provider;
providing, by the identity provider to the service provider, a login status indicating that the user is authenticated to be logged into an account of the service provider associated with the user, the identity provider authenticating based on one or more credentials associated with the request and the account of the service provider, wherein the service provider does not perform the authenticating, and based on the login status, the service provider authorizing the user to access a service provided by the service provider without requiring the user to log into the service provider;
providing, by the identity provider to the service provider, a widget associated with the login status, the widget being configured to be provided to the user within the user interface of the service provider and present one or more settings associated with the user, including a first setting and a second setting, wherein the first setting is used by the service provider and the second setting is used by another service provider and not used by the service provider, the another service provider is different from the identity provider, and a user-defined group of service providers including the service provider and the another service provider are commonly managed by the user;
in response to the user not logged into the service provider while accessing the service, changing one or more settings of the service based on the authenticating of the service by the identity provider; and
in response to:
receiving, by the identity provider, the credentials of the user in an encrypted form;
confirming, by the identity provider, that the identity provider has received the credentials of the user; and
at least one of the following:
receiving, from the service provider, confirmation whether the service provider has authenticated the credentials, or
confirming, by the identity provider, to the service provider that the credentials have been authenticated, and the service provider, to provide access to the service to the user.

2. The method of claim 1, wherein the widget is associated with the identity provider.

3. The method of claim 1, wherein the widget being configured to present one or more settings associated with the user comprises the widget being configured to expand into the user interface of the service provider to present the one or more settings associated with the user within the user interface of the service provider.

4. The method of claim 1, further comprising:
receiving input from the user that changes a value associated with the second setting that affects another service provided by the another service provider, without authenticating the user for the another service provider.

5. The method of claim 1, further comprising:
receiving input from the user that adds a third setting associated with the account associated with the user, wherein the third setting affects at least the service provided by the service provider and affects another service provided by the another service provider.

6. The method of claim 1, further comprising:
receiving input from the user that adds a third setting associated with the account associated with the user, wherein the third setting does not affect the service provided by the service provider.

7. A non-transitory computer readable medium having stored therein computer executable instructions for:
receiving, by an identity provider, a request to login a user associated with a service provider via a user interface of the service provider, the service provider being different from the identity provider;
providing, by the identity provider to the service provider, a login status indicating that the user is authenticated to be logged into an account of the service provider associated with the user, the identity provider authenticating based on one or more credentials associated with the request and the account of the service provider, wherein the service provider does not perform the authenticating, and based on the login status, the service provider authorizing the user to access a service provided by the service provider without requiring the user to log into the service provider;
providing, by the identity provider to the service provider, a widget associated with the login status, the widget being configured to be provided to the user within the user interface of the service provider and present one or more settings associated with the user, including a first setting and a second setting, wherein the first setting is used by the service provider and the second setting is used by another service provider and not used by the service provider, the another service provider is different from the identity provider, and a user-defined group of service providers including the service provider and the another service provider are commonly managed by the user; and
in response to the user not logged into the service provider while accessing the service, changing one or more settings of the service based on the authenticating of the service by the identity provider;
and
in response to;
receiving, by the identity provider, the credentials of the user in an encrypted form;
confirming, by the identity provider, that the identity provider has received the credentials of the user; and
at least one of the following:
receiving, from the service provider, confirmation whether the service provider has authenticated the credentials, or
confirming, by the identity provider, to the service provider that the credentials have been authenticated,
providing, by the service provider, access to the service to the user.

8. The non-transitory computer readable medium of claim 7, wherein the widget is associated with the identity provider.

9. The non-transitory computer readable medium of claim 7, wherein the widget being configured to present one or more settings associated with the user comprises the widget being configured to expand into the user interface of the service provider to present the one or more settings associated with the user within the user interface of the service provider.

10. The non-transitory computer readable medium of claim 7, further comprising: receiving input from the user that changes a value associated with the second setting that affects another service provided by the another service provider, without authenticating the user for the another service provider.

11. The non-transitory computer readable medium of claim 7, further comprising: receiving input from the user that adds a third setting associated with the account associated with the user, wherein the third setting affects at least the service provided by the service provider and affects another service provided by the another service provider.

12. The non-transitory computer readable medium of claim 7, further comprising: for the identity provider receiving the credentials of the user in an encrypted form, the identity provider performs the authenticating of the credentials for the service of the service provider, and communicates with the service provider that the user is credentialed; and in response to the identity provider not receiving the credentials of the user in the encrypted form, the authenticating of the credentials for the service of the service provider is performed by the identity provider, and the identity provider encrypts the credentials and provides the encrypted credentials to the service.

13. At least one computing device comprising non-transitory storage and a computer processor, the computer processor having instructions stored in the non-transitory storage, the instructions comprising:
  receiving, by an identity provider, a request to login a user associated with a service provider via a user interface of the service provider, the service provider being different from the identity provider;
  providing, by the identity provider to the service provider, a login status indicating that the user is authenticated to be logged into an account of the service provider associated with the user, the identity provider authenticating based on one or more credentials associated with the request and the account of the service provider, wherein the service provider does not perform the authenticating, and based on the login status, the service provider authorizing the user to access a service provided by the service provider without requiring the user to log into the service provider;
  providing, by the identity provider to the service provider, a widget associated with the login status, the widget being configured to be provided to the user within the user interface of the service provider and present one or more settings associated with the user, including a first setting and a second setting, wherein the first setting is used by the service provider and the second setting is used by another service provider and not used by the service provider, the another service provider is different from the identity provider, and a user-defined group of service providers including the service provider and the another service provider are commonly managed by the user; and
  in response to the user not logged into the service provider while accessing the service, changing one or more settings of the service based on the authenticating of the service by the identity provider;
  and
  in response to:
  receiving, by the identity provider, the credentials of the user in an encrypted form;
  confirming, by the identity provider, that the identity provider has received the credentials of the user; and
  at least one of the following:
    receiving, from the service provider, confirmation whether the service provider has authenticated the credentials, or
    confirming, by the identity provider, to the service provider that the credentials have been authenticated,
  providing, by the service provider, access to the service to the user.

14. The at least one computing device of claim 13, wherein the widget is associated with the identity provider.

15. The at least one computing device of claim 13, wherein the widget being configured to present one or more settings associated with the user comprises the widget being configured to expand into the user interface of the service provider to present the one or more settings associated with the user within the user interface of the service provider.

16. The at least one computing device of claim 13, wherein the processor is further configured to perform:
  receiving input from the user that changes a value associated with the second setting that affects another service provided by the another service provider, without authenticating the user for the another service provider.

17. The at least one computing device of claim 13, wherein the processor is further configured to perform:
  receiving input from the user that adds a third setting associated with the account associated with the user, wherein the third setting affects at least the service provided by the service provider and affects another service provided by the another service provider.

18. The at least one computing device of claim 13, wherein the processor is further configured to perform:
  receiving input from the user that adds a third setting associated with the account associated with the user, wherein the third setting does not affect the service provided by the service provider.

19. The at least one computing device of claim 13, further comprising:
  for the identity provider receiving the credentials of the user in an encrypted form, the identity provider performs the authenticating of the credentials for the service of the service provider, and communicates with the service provider that the user is credentialed; and
  for the identity provider not receiving the credentials of the user in the encrypted form, the authenticating of the credentials for the service of the service provider is performed by the identity provider, and the identity provider encrypts the credentials and provides the encrypted credentials to the service.

* * * * *